P. J. Marqua,
Hobby Horse.
No. 46,258. Patented Feb. 7, 1865.
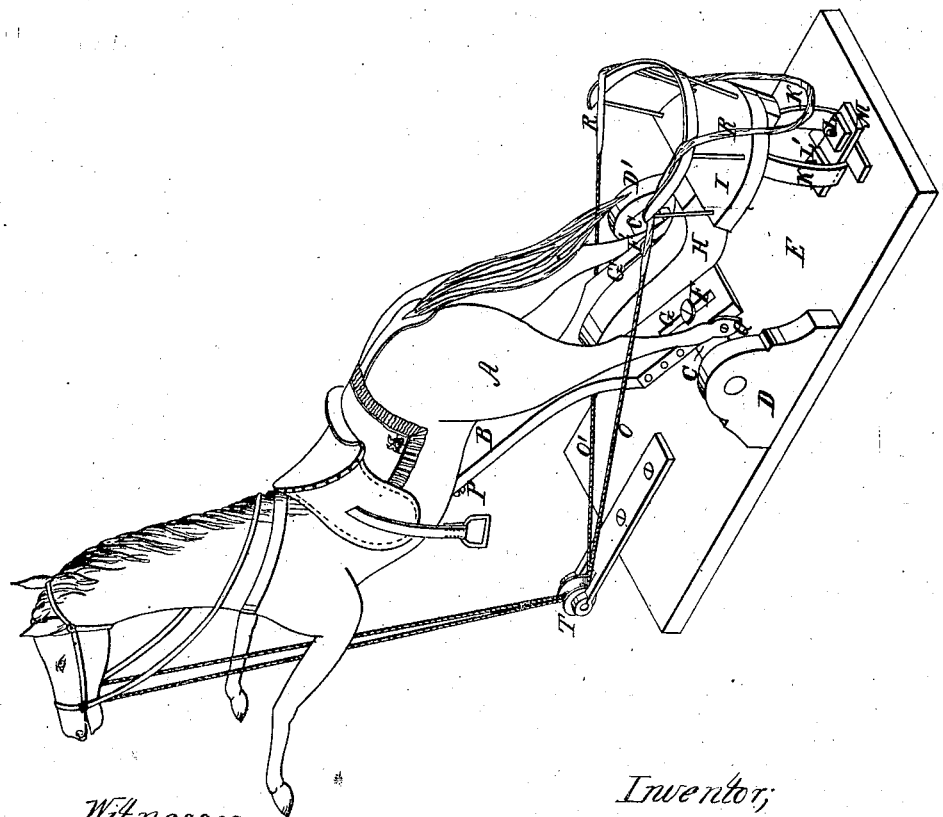

UNITED STATES PATENT OFFICE.

PHILLIP J. MARQUA, OF CINCINNATI, OHIO.

HOBBY-HORSE.

Specification forming part of Letters Patent No. 46,258, dated February 7, 1865.

*To all whom it may concern:*

Be it known that I, PHILIP J. MARQUA, of Cincinnati, county of Hamilton, and State of Ohio, have invented a certain new and useful Improvement in Hobby-Horses; and I do hereby declare the following to be a full, clear, and exact description thereof, reference being had to the accompanying drawings, making part of this specification.

My invention belongs to the class known as "rearing hobby horses," and relates to provisions whereby two or more children may ride on the apparatus at the same time, and to a device whereby each child may assist in the rocking of the horse, and also to a method of counterbalancing any inequality in the weight of the children, and to a peculiar form of spring.

The horse A has its hind legs secured to the vibrating beam B, whose forward end is screwed fast to the horse's belly by the screw P. The beam B has an axle, C, which journals in standards D D', projecting vertically from the base E. The beam B is attached to the axle C by bolts or screws F F', which, passing through slots G G' in the beam B, permit the apparatus to be adjusted to suit the different weights of the riders occupying the horse and seat.

When it is desired to have a child ride in the seat alone, the horse may be set farther forward by the screws Q, which pass through the hind hoofs of the horse, and also by the screw P, which passes through the forward part of the beam B into the horse's belly. The rear end of the beam B terminates in a bracket, H, having the carriage-seat I secured to it, and under this seat there is attached to the bracket H an india-rubber thong, K, occupying a staple or otherwise secured on the under side of the seat I, and whose ends are secured in a clamp, L L' M. A greater tension can be given to the thong K by drawing its ends farther into the clamp or by doubling the thong.

The rider occupying the seat assists in moving the apparatus by means of the cords or reins O O', which, passing around the grooved roller T, are attached to the horse's head or bit.

The reins O O' may be provided with a thong, R, for the more secure grasping thereof by the rider in the carriage-seat.

I have selected to illustrate my invention the form adopted by me in preference to various others; but I do not propose to confine myself to the precise arrangement of parts herein shown so long as I attain the desired result by means substantially equivalent. For example, the axle on which the horse vibrates may be fixed rigidly in standards, the hind hoofs of the horse being journaled upon said axle in any preferred way; or my invention may be modified by placing two horses on the vibrating beam B with only one seat between them, or two horses and two seats may be attached to the base E.

I claim herein as new and of my invention—

1. The combined rearing hobby-horse A, vibrating beam B, seat I, and spring K, arranged and operating substantially as set forth.

2. The slots G G' and the devices for the relative adjustment of the seat and horse, as explained.

3. The arrangement of the rearing hobby-horse A, seat I, reins O O', and pulley T, adapted to operate as set forth.

4. The india-rubber thong K and clamp L L' M, arranged as set forth.

In testimony of which invention I hereunto set my hand.

P. J. MARQUA.

Witnesses:
 JAMES H. LAYMAN,
 GEO. H. KNIGHT.